(12) United States Patent
Nigst

(10) Patent No.: US 6,377,180 B1
(45) Date of Patent: Apr. 23, 2002

(54) CIRCUIT FOR EVALUATING THERMOCOUPLE MEASUREMENT SIGNALS

(75) Inventor: Helmut Nigst, Lapeer (DE)

(73) Assignee: Webasto Thermosysteme International GmbH, Stockdorf (DE)

(*) Notice: Subject to any disclaimer, the term of this patent is extended or adjusted under 35 U.S.C. 154(b) by 0 days.

(21) Appl. No.: 09/620,969

(22) Filed: Jul. 20, 2000

(30) Foreign Application Priority Data

Jul. 22, 1999 (DE) .......................................... 199 34 489

(51) Int. Cl.⁷ .............................................. G08B 17/00
(52) U.S. Cl. .......................................... 340/584; 374/43
(58) Field of Search ................................ 340/584, 588, 340/589, 449; 330/256, 266, 272, 289; 374/43, 102, 128, 132, 133

(56) References Cited

U.S. PATENT DOCUMENTS

| 3,860,875 A | * | 1/1975 | Darnell et al. ................. 328/3 |
| 3,995,174 A | * | 11/1976 | Zrudsky ..................... 307/240 |
| 4,104,998 A | * | 8/1978 | Fenn ....................... 123/117 R |
| 4,211,113 A | | 7/1980 | Harrison |
| 4,518,268 A | * | 5/1985 | Swis et al. .................. 374/144 |
| 4,590,472 A | | 5/1986 | Benson et al. |
| 4,949,469 A | * | 8/1990 | Wachtler ..................... 33/702 |

FOREIGN PATENT DOCUMENTS

| DE | 38 32 145 | 3/1990 |
| JP | 62-144233 | 6/1987 |
| JP | 02-225911 | 9/1990 |
| JP | 05-033933 | 2/1993 |
| JP | 05-196667 | 8/1993 |
| JP | 10-213321 | 8/1998 |
| WO | WO 96/39617 | 12/1996 |

OTHER PUBLICATIONS

Patent Abstracts of Japan, Sep. 14, 1979, vol. 3, No. 110, 54–87280, Nov. 7, 1979, Tokyo Shibaura Denki K.K., English Abstracts.
Patent Abstracts of Japan, 11051780, Feb. 26, 1999, Nippon Avionics Co., Ltd., English Abstract.
Z:I&CS, The Industrial and Process Control Magazine, Mar. 1985, p. 85, IC AMP Detects Open Thermocouples, Charles Whiting.

* cited by examiner

*Primary Examiner*—John Tweel
(74) *Attorney, Agent, or Firm*—Nixon Peabody LLP; David S. Safran

(57) ABSTRACT

A circuit for evaluation of a measurement signal of a thermocouple (S1), especially a thermocouple which is used as a flame detector (F) of a motor vehicle heater, with an amplifier (U1) for amplifying the measurement signal and with a microcontroller ($\mu C$) which is supplied with the amplified measurement signal as the input signal. A switch (T2) is provided for short circuiting the input (15) of the amplifier (U1) during a pause in the measurement cycle, and the microcontroller ($\mu C$) has a memory in which the input signal is deposited during the measurement cycle pause, and the microcontroller ($\mu C$) has a correction algorithm to correct the measurement signal using the signal deposited in the memory before evaluation. This measure enables an economical operational amplifier to be used as the amplifier (U1) while still attaining reliable information about the temperature prevailing at the measurement site.

13 Claims, 2 Drawing Sheets

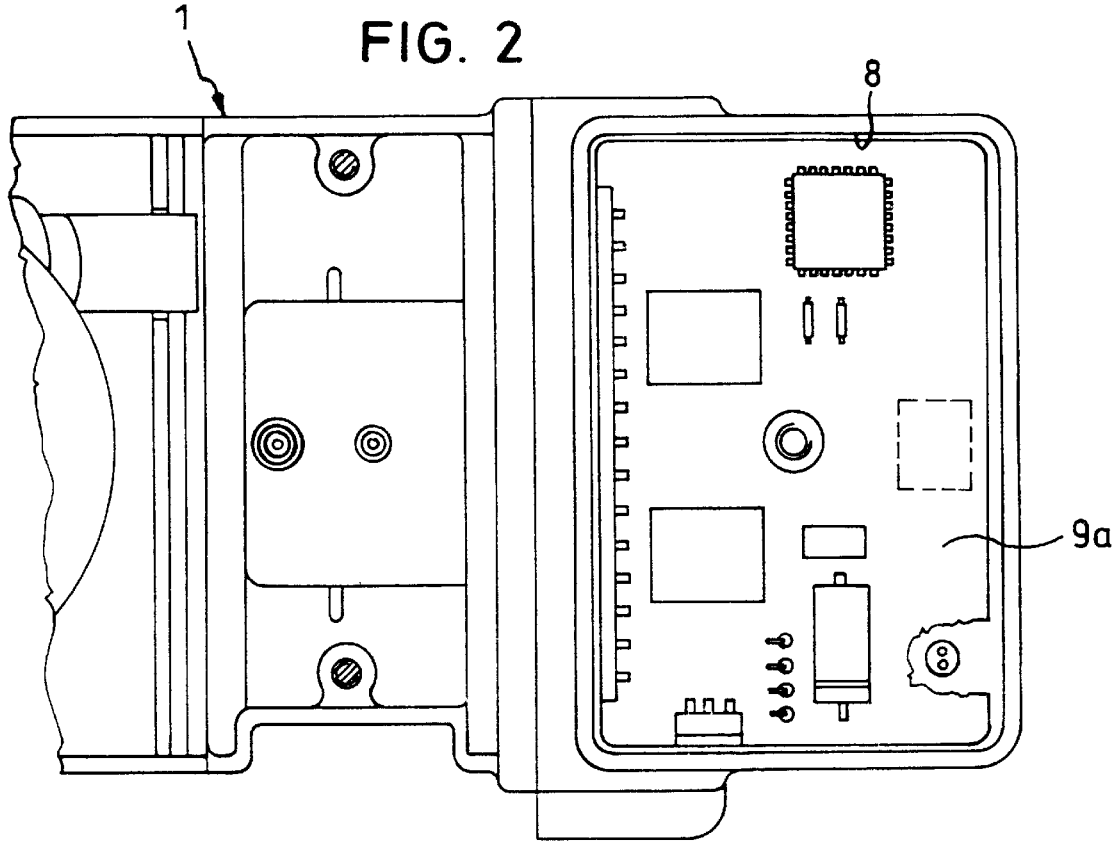
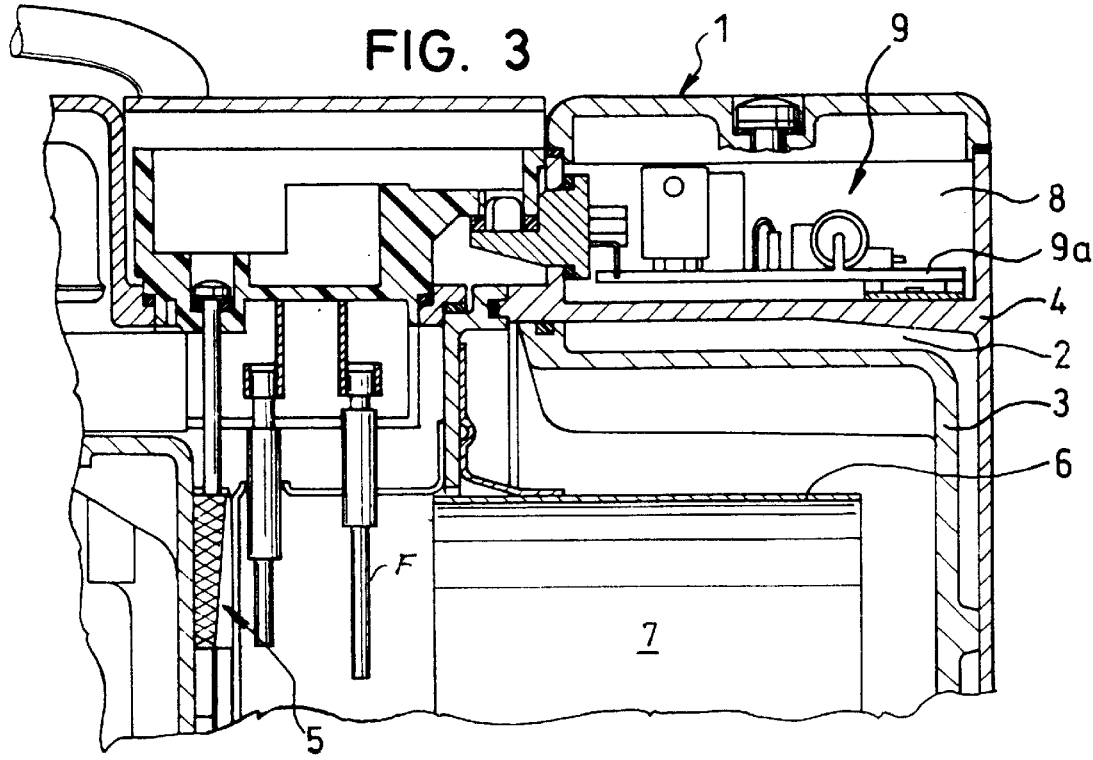

CIRCUIT FOR EVALUATING THERMOCOUPLE MEASUREMENT SIGNALS

BACKGROUND OF THE INVENTION

1. Field of the Invention

This invention relates to a circuit for evaluation of a measurement signal of a thermocouple, especially a thermocouple which is used as a flame detector of a motor vehicle heater, with an amplifier for amplifying the measurement signal and with a microcontroller which is supplied with the amplified measurement signal as the input signal.

2. Description of Related Art

In the evaluation of thermocouple measurement signals, typically a series of problems rise. To make it possible to evaluate these measurement signals with a voltage in the millivolt range by a microcontroller, they must be amplified into the volt range. Based on the required evaluation accuracy, expensive amplifiers, specifically measuring amplifiers, especially in the form of integrated components, are ordinarily used for this purposes.

The problem in the evaluation of thermocouple measurement signals is, furthermore, that a defect of the thermocouple, for example, its interruption, cannot be detected without higher circuit cost. Another problem is the fact that the thermocouple measurement signal, depending on the temperature difference between the thermocouple and the control device or amplifier, has a positive or negative sign, while the microcontroller can typically process only positive voltages. Finally, on principle, only temperature differences between two points can be measured with a thermocouple. To determine the absolute temperature by means of a thermocouple, therefore additional, conventionally complex measures must be taken.

SUMMARY OF THE INVENTION

In view of the foregoing, a primary object of this invention is to devise a circuit for evaluating a measurement signal of a thermocouple of the initially mentioned type which ensures the required accuracy using economical components.

This object is achieved in a circuit for evaluation of a measurement signal of a thermocouple, especially of a thermocouple which is used as a flame detector of a motor vehicle heater, with an amplifier for amplifying the measurement signal and with a microcontroller which is supplied with the amplified measurement signal as the input signal, by there being a switch for short circuiting the input of the amplifier during a pause in the measurement cycle, the microcontroller having a memory in which the input signal is deposited during the measurement cycle pause, and the microcontroller having a correction algorithm to correct the measurement signal using the signal deposited in the memory before evaluation.

In other words, the invention calls for acquisition of construction-induced errors of the amplifier, which acquired errors are thereupon taken into account in the microcontroller in the evaluation of the thermocouple measurement signal, so that a measurement signal which has been corrected with respect to amplifier errors is evaluated. The measures in accordance with the invention thus allow use of an economical, faulty amplifier for amplification of the thermocouple measurement signal instead of the expensive measuring amplifiers which have been used in the past.

Typically, an economical, less precise standard operational amplifier costs much less than, for example, roughly only one tenth as much, a high precision measuring amplifier. The measures in accordance with the invention, for error correction, i.e., the components and programming measures used for this in the microcontroller increase the costs only slightly, so that the circuit according to the invention is, in any case, much more economical than those existing heretofore. Furthermore, it has been ascertained that the accuracy which can be achieved by the error correction of the invention, when using an economical amplifier, ensures a reliable conclusion about the temperature prevailing at the measurement site without recourse to the accuracy made available by a measuring amplifier.

The amplifier of the inventive evaluation circuit is advantageously connected as a difference amplifier with a noninverting input and an inverting input which are connected to two terminals of the thermocouple and are bridged by a switch, by the closing of which pauses the measurement cycle, the voltage inherent in the absence of an amplifier being relayed to the microcontroller for subsequent error correction of the measurement signal.

The switch is preferably a semiconductor switch, advantageously in the form of a field effect transistor (FET). In the case of connecting the amplifier as a difference amplifier, this switch is connected between its noninverting input and its inverting input.

The switch is activated advantageously via the control output of the microcontroller which carries the measurement cycle.

In order to economically and simply overcome the initially addressed problem of detection of a thermocouple defect, according to one advantageous development of the invention, there is additionally a circuit for supplying a test current to the thermocouple during a pause in the measurement cycle, and the microcontroller comprises a means for evaluating its input signal which is present in the pause of the measurement cycle. Preferably, this circuit is coupled on the input side to the amplifier such that no noticeable voltage is produced at the amplifier output by the test current when the thermocouple is working properly, while when the thermocouple is defective, an indicative voltage which differs from the previous one occurs at the amplifier output.

The test current for detecting the thermocouple state is preferably sent to the thermocouple by means of a switch which, in turn, is designed advantageously as a semiconductor switch, for example, as a FET, and is triggered via the control output of the microcontroller, i.e., the output which carries the measurement cycle.

According to an advantageous development of the invention, the initially mentioned problem, according to which a microcontroller can process typically only positive voltages, is surmounted, in accordance with the invention, by a positive DC voltage being added to the amplified measurement signal, the DC voltage being higher than the amount of the negative measurement signal voltage at the addition point. This ensures that the voltage at the microcontroller input is always in the positive range.

Finally, a measure is in accordance with the invention to solve the initially mentioned problem of acquiring the absolute temperature by means of the thermocouple. Accordingly, there is a means for measuring the absolute temperature of the board which bears the amplifier and the temperature difference between the measurement point of the thermocouple and the board, from which the microcontroller computes the absolute temperature of the measurement point.

In the following, a preferred embodiment of the invention is explained using the drawings.

BRIEF DESCRIPTION OF THE DRAWINGS

FIG. 2 is an partial overhead view of a heater for which the circuit of FIG. 1 is suited; and FIG. 3 shows a partial section of the heater.

DETAILED DESCRIPTION OF THE INVENTION

Figure 1:
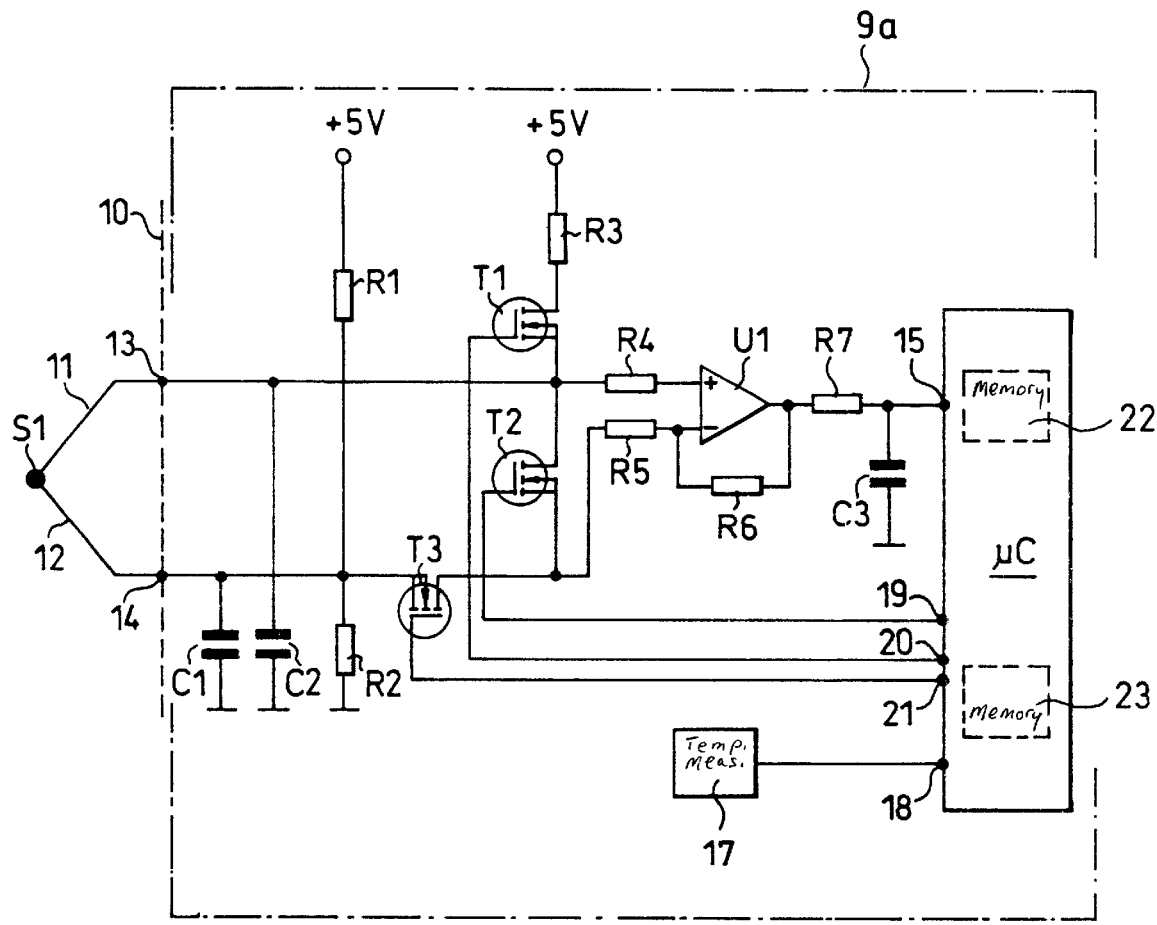
FIG. 1 schematically shows one embodiment of the circuit in accordance with the invention.

FIG. 1 schematically shows, to the left of a broken line 10, a thermocouple S1 and to the right of the line 10, a board 9a with an evaluation circuit for the thermocouple S1 which forms, for example, part of a control device 9, especially for a motor vehicle heater 1 as shown in FIGS. 2 & 3. The actual evaluation of the thermocouple measurement signal takes place in a measurement action by a microcontroller which is labeled µC in FIG. 1. Upstream of the microcontroller µC, an operational amplifier U1 is connected to amplify the measurement signals, which are in the millivolt range, to a level which can be processed in a D/A converter (not shown) and which follows the microcontroller input.

In FIGS. 2 & 3 the heater is labeled 1. As an example, an auxiliary vehicle heater is shown which works with a liquid heat transfer medium, for example, water. Such heater is incorporated, for example, into the coolant loop of a motor vehicle. The liquid heat transfer medium flows through an intermediate space 2 which is formed between a heat exchanger 3 and a jacket-shaped external housing 4. Furthermore, the heater 1 has a schematically shown burner 5 which projects into a combustion chamber 7 which is formed by a combustion pipe 6. The inlets and outlets which form connections in the external housing 4 for the liquid heat transfer medium for the heater 1 are not shown in the drawings. As follows especially from FIG. 2, a receiving space 8 which is advantageously cast on the exterior of a jacket-shaped external housing 4 as part thereof. The receiving space 8 houses a control device 9 which comprises one or more boards, in this example, a board 9a, which can be designed as a printed circuit board and/or can be equipped with the corresponding electrical or electronic components.

In particular, the thermocouple S1 is connected via two supply leads 11, 12 to a measurement point which comprises two terminals 13, 14 on the board 9a on which the electronics of the control device 9 is implemented. The measurement point terminal 13 is connected via a resistor R4 to the noninverting input (+) of the operational amplifier U1. The measurement point terminal 14 is connected via a transistor T3 and a resistor R5 to the inverting input (−) of the operational amplifier U1. To adjust the gain of the operational amplifier U1, its inverting input is connected to its output via a resistor R6. The output of the operational amplifier U1 is, moreover, connected via a resistor R7 to an input 15 of the microcontroller µC.

The capacitors C1, C2, and C3 are designed as filter elements or for EMC suppression. Accordingly, the capacitors C1 and C2 connected to ground are connected to the measurement point terminals 14 and 13, respectively, and the capacitor C3 which is connected to ground is connected to the input 15 of the microcontroller.

A DC voltage at a level of +5V is applied via a voltage divider, comprised of resistors R1 and R2, via a connecting line connected between the measurement point terminal 14 and the transistor T3.

A temperature measurement means 17 is connected to the temperature acquisition input 18 of the microcontroller µC. The temperature measurement means 17 is made, for example, in the form of a commercial, economical IC which, if necessary, inputs the measured temperature already in digital form into the microcontroller µC or in analog form into an integrated A/D converter. The temperature measurement means 17 measures the absolute temperature on the board of the control device, and thus, also on the measurement point terminals 13, 14 on the board. In the microcontroller µC, the absolute temperature at the measurement points is.computed from the temperature difference between the temperature at the measurement point and the absolute temperature on the board of the control device. For the case in which the thermocouple is used as a flame detector F in a motor vehicle heater, information about the absolute temperature is useful in the evaluation of the states flame ON and flame OFF.

To be able to use an economical, but moderately accurate standard operational amplifier as the operational amplifier U1, which standard operational amplifier is, in principle, subject to errors, there is a semiconductor switch in the form of a transistor, preferably a FET, specifically the transistor T2, which is connected via the resistors R4 and R5 between the noninverting and inverting input of the operational amplifier U1 and is controlled by a first control output 19 of the microcontroller µC. The transistor T2 is triggered such that the operational amplifier U1 is short circuited on the input side during a pause of the measurement cycle. The microcontroller µC comprises a memory 22 in which the output signal of the operational amplifier U1, i.e., the signal which is at its input 15, is deposited during the measurement cycle pause. In another memory 23 of the microcontroller µC, a correction algorithm is stored in order to correct the measurement signal supplied in amplified form to the input 15 during a measurement cycle based on the deposited signal, before actual evaluation. This results in that the error of inaccuracy of the operational amplifier U1 is taken into account in the evaluation so that it is unnecessary to use an expensive measuring amplifier.

Since the error inherent in the operational amplifier U1 can change over the period of operation, especially in conjunction with a heat-generating heater and the control device located in its vicinity, the above explained error measurement is taken preferably cyclically.

To detect the serviceability of the thermocouple S1 or a defect thereof, moreover, there is a circuit for supplying a test current to the thermocouple S1. This circuit comprises a transistor T1 which is triggered via a second control output 20 of the microcontroller µC, and which, on the other hand, is supplied via a resistor R3 with positive voltage, specifically with a voltage of +5V. Moreover, the transistor T1 is connected using the connecting line between the measurement point terminal 13 and the resistor R4 to the noninverting input of the microcontroller µC.

When the transistor T1 is forcibly tripped in a measurement cycle pause which has been communicated via the second control output 20, the DC voltage of +5V is applied via the transistor T1 to the measurement point terminal 13, and thus, to the thermocouple S1, via which the test current flows to the other measurement point terminal 14 when the thermocouple S1 is intact, from which the test current drains to ground via the resistor R2. In this case, i.e., with the thermocouple S1 intact, at the output of the operational amplifier U1, there is no signal or a very small signal.

Conversely, if the thermocouple S1 is defective, and thus the test current is not relayed, essentially the +5V DC voltage is on the noninverting input of the operational amplifier U1, so that there is a relatively high voltage at the output of the operational amplifier U1, which is detected in the microcontroller $\mu$C and which is treated as an indication that a defect exists in the sensor S1.

The other transistor T3, which is in the connecting line between the measurement point 14 and the resistor R5 and the inverting input of the operational amplifier U1, is triggered via a third control input 21 of the microcontroller $\mu$C. Conventionally, the transistor T3 is forcibly tripped to relay the signal from the measurement point 14 to the operational amplifier U1. However, depending on the practical use of the thermocouple S1, it can be desirable, at a certain point in the measurement cycle, to electrically separate the thermocouple S1 from the downstream circuit, i.e., to not relay a measurement signal to the operational amplifier U1.

The voltage divider formed of R1, R2 adds an exactly known positive voltage to the measurement signal delivered by the thermocouple S1 in order to ensure that there is always a positive voltage at the input 15 of the microcontroller $\mu$C. This is important since microcontrollers conventionally process only positive voltages, while the thermocouple S1 delivers positive and negative voltages. Therefore, the added positive voltage is chosen to be quantitatively higher than the maximum amount of the measurement voltage deliverable by the thermocouple S1.

What is claimed is:

1. Circuit for evaluation of a measurement signal of a thermocouple, comprising an amplifier having an input for receiving the measurement signal of the thermocouple and an output for issuing an amplified measurement signal, a microcontroller having an input connected to receive the amplified measurement signal from the amplifier as an input signal, a switch for short-circuiting the input of the amplifier during a pause in the measurement cycle, and a circuit for supplying a test current to the thermocouple during the pause in the measurement cycle, and wherein the microcontroller has a means for evaluating an input signal which is present at the input of the microcontroller during the pause of the measurement cycle, the microcontroller having a memory in which the amplified measurement signal is stored during the measurement cycle pause, and the microcontroller having a correction algorithm which corrects the amplified measurement signal using a signal stored in the memory before evaluating of the amplified measurement signal.

2. Circuit as claimed in claim 1, wherein the amplifier is a standard operational amplifier.

3. Circuit as claimed in claim 2, wherein the thermocouple has two terminals; and wherein the amplifier is a difference amplifier with a noninverting input and an inverting input which are connected to the two terminals of the thermocouple and which are bridged by a switch.

4. Circuit as claimed in claim 1, wherein the switch is a semiconductor switch.

5. Circuit as claimed in claim 4, wherein the semiconductor switch is a field effect transistor.

6. Circuit as claimed in claim 3, wherein the switch is triggered via a control output of the microcontroller which carries a measurement signal.

7. Circuit as claimed in claim 1, wherein the test current is supplied via a switch.

8. Circuit as claimed in claim 7, wherein the switch for supplying the test current is a semiconductor switch.

9. Circuit as claimed in claim 8, wherein the semiconductor switch is a field effect transistor.

10. Circuit as claimed in claim 7, wherein the switch for supplying the test current is triggered via a control output of the microcontroller which carries a measurement signal.

11. Circuit as claimed in claim 1, further comprising a means for adding a positive DC voltage to the measurement signal, said positive DC voltage being higher than a maximum voltage value of the measurement signal.

12. Circuit as claimed in claim 1, wherein the amplifier is mounted on a board, and wherein a means for measuring the absolute temperature of the board on which the amplifier is mounted, the microcontroller computing the absolute temperature of the measurement point based on a temperature difference between that at the measurement point of the thermocouple and that of the board.

13. Circuit as claimed in claim 1, wherein said thermocouple is a flame detector of a motor vehicle heater.

* * * * *